Feb. 28, 1928.
A. J. B. MARSAT
1,661,077
VEHICLE HEADLIGHT
Filed June 21, 1924
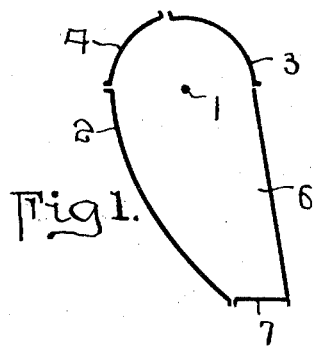
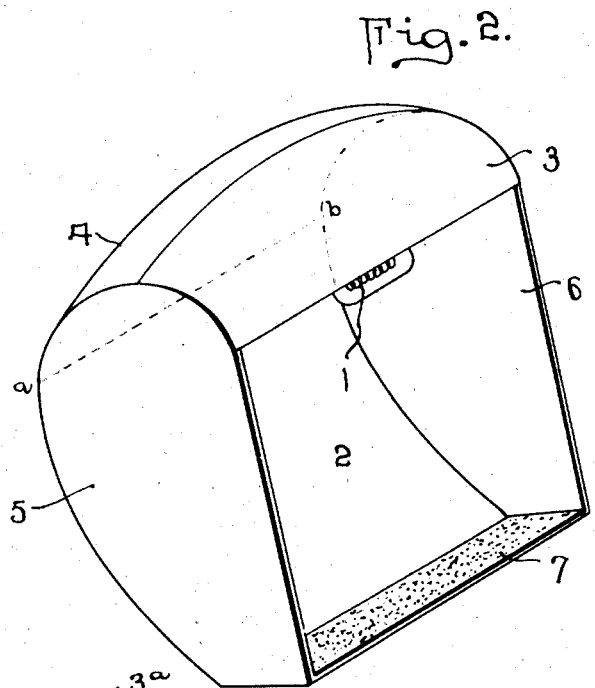
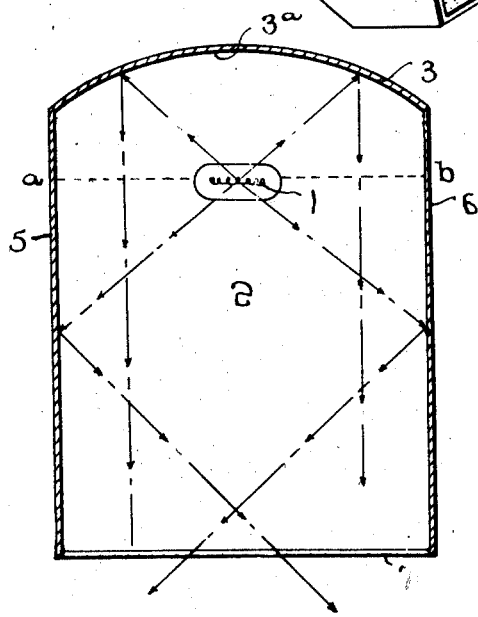
A.J.B. Marsat
INVENTOR.
BY Marks Clerk
ATTORNEYS.

Patented Feb. 28, 1928.

1,661,077

UNITED STATES PATENT OFFICE.

ANTOINE JEAN-BAPTISTE MARSAT, OF VERRIERES LE BUISSON, FRANCE.

VEHICLE HEADLIGHT.

Application filed June 21, 1924, Serial No. 721,575, and in France July 13, 1923.

Head-lights for motor vehicles of the non-blinding type are known wherein a main horizontal beam of substantially flat form is produced which generally include an upper reflector in front of the illuminant and a lower reflector projecting the beam of light on the road.

The present invention has for its object to collect that part of the total light which generally is not utilized in such head-lights and making use of the same chiefly for lighting the portion of the road and the sides thereof between the immediate foreground and the more distant regions which are illuminated by the main beam.

This result is obtained by the addition to the non-blinding head light of an optical system comprising chiefly a concave mirror disposed above and to the rear of the illuminant which latter is in the form of an elongated filament.

This optical system comprises further two lateral mirrors and a horizontal mirror below and in front of the illuminant, the whole reflecting device thus forming a sort of case almost entirely surrounding the illuminant.

In the accompanying drawings wherein an improved embodiment of the invention is illustrated:

Figure 1 is a diagrammatic vertical section through the improved head light taken at right angles to the axis of the elongated filament.

Figure 2 is a perspective view of the head light showing the two upper mirrors united.

Figure 3 is a vertical transverse section through the head light.

Referring to the drawing in detail, the head light comprises a horizontally elongated illuminant such as an electric lamp filament 1 wound in a spiral of small diameter relative to its length and disposed between the mirror 2 situated at its lower rear part and a smaller mirror 3 at its upper front part. The mirror 2 has the shape of a parabolic cylinder, the focal line of which being situated on the filament. This mirror produces a substantially horizontal beam slightly divergent in the horizontal direction. The mirror 3 is a surface of revolution around an axis coinciding with the illuminant 1, its generating line being a parabola $3^a$, the focus of which is also on the illuminant.

The head light is completed at the upper rear part of the illuminant by a concave mirror 4 mounted between the mirrors 2 and 3 and serving to project light upon the road between the immediate fore-ground which is directly illuminated by the illuminant and the more distant regions which receive the light of the main beam from the mirror 2. The dotted line $a$—$b$ in Fig. 2 indicates the line of juncture of the upper rear mirror 4 and the lower mirror 2.

At the sides and extending below the illuminant are disposed the two mirrors 5 and 6 which reflect the light in beams upon the foreground of the road, deflecting it to the right and left, thus further illuminating the foreground. A small horizontal mirror 7 having a diffusing surface is arranged below and forwardly of the illuminant 1 and reflects a small amount of non-blinding light above the horizontal.

The light received by the upper front mirror 3 is reflected back upon the mirror 2 and from the latter forwardly projecting a beam somewhat divergent at least in the horizontal direction. The light received by the upper rear concave mirror 4, is reflected directly through the open front of the head light, and is spread out upon the road in front of the vehicle.

What I claim is:

A headlight of the non-blinding type, including an elongated horizontal illuminant perpendicular to the axis of the headlight, a mirror disposed at the rear and below said illuminant, and having the shape of a parabolic cylinder with its focal line on said illuminant, a second mirror disposed at the front of and above said illuminant and having the shape of a surface of revolution about an axis substantially coinciding with the illuminant and having a parabolic generating arc with the focus thereof at the illuminant, a third concave mirror of similar curvature to the second mentioned mirror disposed at the rear and above said illuminant, two mirrors disposed laterally of and below said illuminant, and a flat reflector with a diffusing surface located at the lower edge of the first mentioned mirror and extending horizontally and forwardly.

In witness whereof I have hereunto set my hand.

ANTOINE JEAN-BAPTISTE MARSAT.